US010567942B2

(12) United States Patent
Okumura et al.

(10) Patent No.: US 10,567,942 B2
(45) Date of Patent: Feb. 18, 2020

(54) COMMUNICATION APPARATUS AND COMMUNICATION CONTROL METHOD (71) Applicant: CASIO COMPUTER CO., LTD., Shibuya-ku, Tokyo (JP)

(72) Inventors: Ryo Okumura, Kodaira (JP); Takahiro Tomida, Hamura (JP); Tsutomu Terazaki, Saitama (JP); Toshihiro Takahashi, Kunitachi (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/275,123

(22) Filed: Feb. 13, 2019

(65) Prior Publication Data
US 2019/0261149 A1  Aug. 22, 2019

(30) Foreign Application Priority Data

Feb. 16, 2018 (JP) ................................. 2018-025590

(51) Int. Cl.
| H04W 4/80 | (2018.01) |
| H04B 17/318 | (2015.01) |
| H04W 4/38 | (2018.01) |
| H04W 76/14 | (2018.01) |
| H04M 1/725 | (2006.01) |
| H04W 24/10 | (2009.01) |
| H04W 52/02 | (2009.01) |

(52) U.S. Cl.
CPC ............ *H04W 4/80* (2018.02); *H04B 17/318* (2015.01); *H04M 1/7253* (2013.01); *H04W 4/38* (2018.02); *H04W 24/10* (2013.01); *H04W 76/14* (2018.02); *H04M 1/72569* (2013.01); *H04M 2250/02* (2013.01); *H04W 52/0209* (2013.01)

(58) Field of Classification Search
CPC ......... H04W 4/80; H04W 4/38; H04W 76/14; H04B 17/318
USPC ...................................................... 455/41.2
See application file for complete search history.

(56) References Cited

U.S. PATENT DOCUMENTS 8,467,726 B2    6/2013  Shirakata et al.

FOREIGN PATENT DOCUMENTS

JP         5390612 B2      1/2014

*Primary Examiner* — Eugene Yun
(74) *Attorney, Agent, or Firm* — Holtz, Holtz & Volek PC (57) ABSTRACT A communication apparatus includes a communication unit and a controller. The controller determines, according to a first reference of received signal strength in one communication apparatus which is either an external communication apparatus or the communication apparatus, a transmitted signal strength for a transmission radio wave from the other communication apparatus as a first reference of transmitted signal strength. The controller determines a second reference of transmitted signal strength between the first reference of transmitted signal strength and a maximum strength of transmitted signal strength from the other communication apparatus. When a predetermined condition is satisfied, the controller obtains a received signal strength of the one communication apparatus for the transmission radio wave in the second reference of transmitted signal strength and determines a transmitted signal strength of a transmission radio wave from the other communication apparatus according to the received signal strength.

20 Claims, 7 Drawing Sheets

COMMUNICATION APPARATUS AND COMMUNICATION CONTROL METHOD

CROSS-REFERENCE TO RELATED APPLICATIONS

This application is based upon and claims the benefit of priority from the prior Japanese Patent Application No. 2018-025590, filed on Feb. 16, 2018, the entire contents of which are incorporated herein by reference.

BACKGROUND

The technical field relates to a communication apparatus and a communication control method.

Conventionally, there is an electronic device (communication apparatus) which is able to communicate with external devices by short-range wireless communication such as Bluetooth (registered trademark). Short-range wireless communication is widely used in recent years in order to exchange private data among a plurality of electronic devices owned by the same user.

In such data, the user's live body information such as moving state, number of steps and pulse may be included. Data is transmitted and received using short-range wireless communication between a sensor device attached to the body of the user and a portable electronic device which holds and processes the data. Here, received signal strength of the radio wave periodically changes due to the influence of the change in the distance between the sensor device and the portable electronic device according to the movement of the user and the attenuation due to the human body. According to such change, the communication may become difficult or the transmitted/received signal strength of the radio wave may become stronger than necessary. To cope with the above, there is a technique to raise and decrease the transmission radio wave strength according to the cycle (See WO 2011/055477).

However, the efficient transmitting and receiving of the communication radio wave corresponding to drastic change in the situation cannot be executed by simply solving the problems regarding the periodic change.

SUMMARY

A communication apparatus and a communication control method are disclosed.

According to one embodiment, there is a communication apparatus including: a communication unit which transmits and receives a radio wave; and a controller which performs the following: determines, according to a first reference of received signal strength in one communication apparatus which is either an external communication apparatus or the communication apparatus when in a predetermined communication state with the external communication apparatus through the communication unit, a transmitted signal strength for a transmission radio wave from the other communication apparatus which is either the communication apparatus or the external communication apparatus as a first reference of transmitted signal strength; determines a second reference of transmitted signal strength between the first reference of transmitted signal strength and a maximum strength of transmitted signal strength from the other communication apparatus; and when a predetermined condition is satisfied, obtains a received signal strength of the one communication apparatus for the transmission radio wave in the second reference of transmitted signal strength and determines a transmitted signal strength of a transmission radio wave from the other communication apparatus according to the received signal strength.

DETAILED DESCRIPTION

The present embodiment is described below with reference to the drawings.

Figure 1:
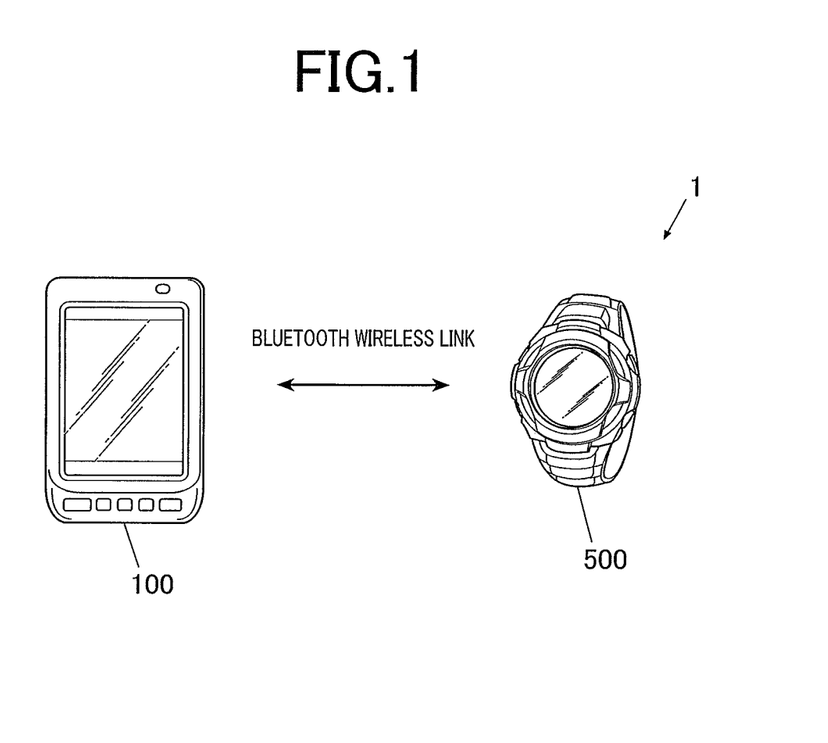
FIG. 1 is a diagram showing an entire configuration of a communication system regarding obtaining live body information.

FIG. 1 is a diagram showing an entire configuration of the communication system 1 regarding obtaining live body information.

The communication system 1 is connected to communicate a plurality of communication apparatuses in order to obtain live body information. The communication apparatus includes an electronic device 100 and a sensor terminal 500.

Short-range wireless communication such as Bluetooth is possible to communicate between the electronic device 100 and the sensor terminal 500.

Figure 2:
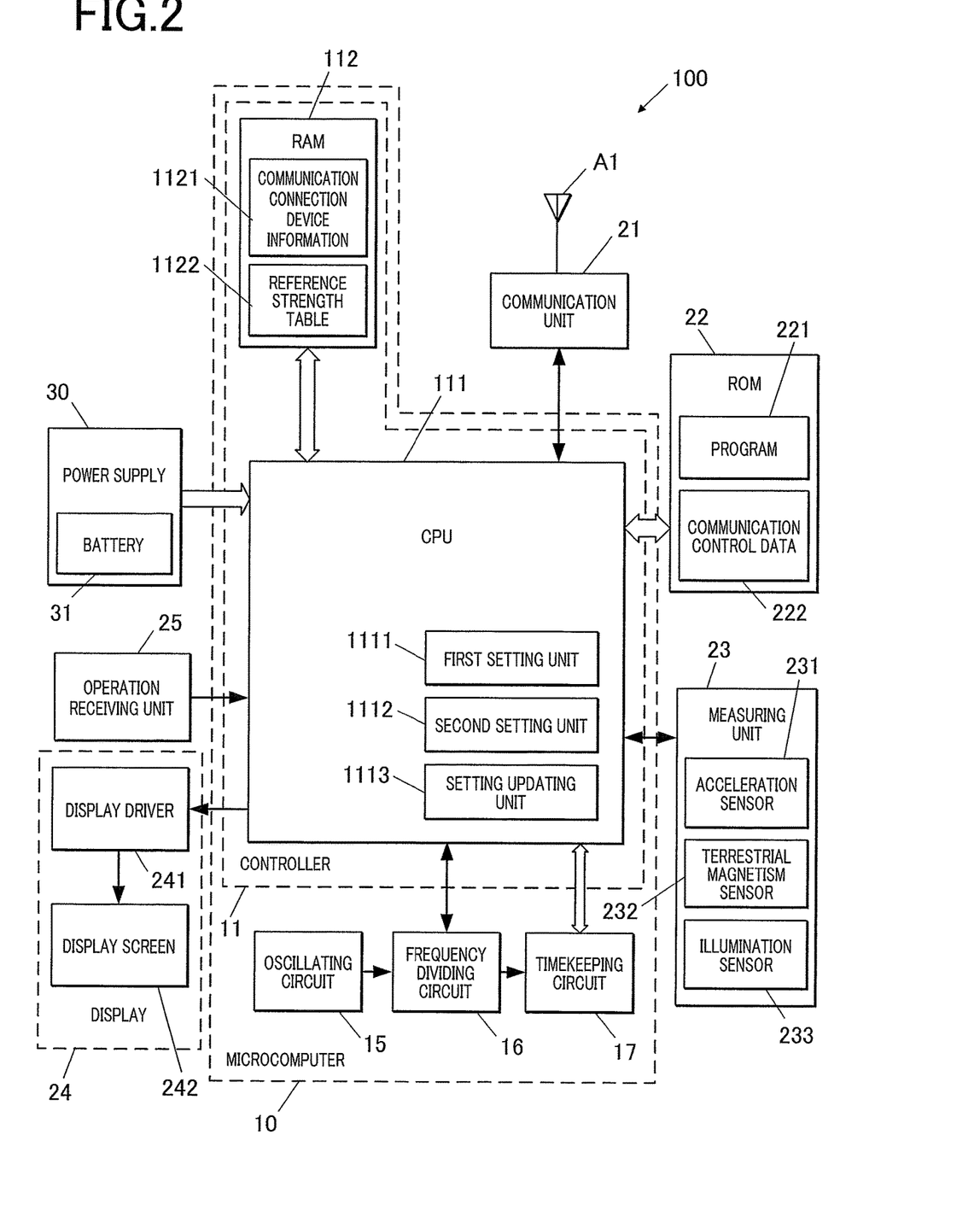
FIG. 2 is a block diagram showing a functional configuration of an electronic device.

FIG. 2 is a block diagram showing a functional configuration of an electronic device 100.

The electronic device 100 is a device which is portable such as a smartphone. The electronic device 100 includes a microcomputer 10, a communication unit 21 and antenna A1, a ROM 22 (Read Only Memory), a measuring unit 23 (motion detector), a display 24, an operation receiver 25, and a power supply 30.

The microcomputer 10 performs the process regarding various operations executed by the electronic device 100. The microcomputer 10 includes a controller 11, an oscillating circuit 15, a frequency dividing circuit 16, and a time keeping circuit 17.

The controller 11 is a processor which centrally controls the entire operation of the electronic device 100. The controller 11 includes a CPU 111 (Central Processing Unit) and a RAM 112 (Random Access Memory).

The CPU 111 performs various calculating processes to perform the control operation. The control operation may include control of various displays by the display 24 such as date/time based on the date/time kept by the timekeeping circuit 17 and control of the processes for the live body information obtained from the sensor terminal 500. As described later, the CPU 111 operates as a first setting unit 1111, a second setting unit 1112, and a setting updating unit 1113 according to one embodiment of the communication apparatus.

The RAM 112 provides a memory space for work in the CPU 111 and temporarily stores data. The RAM 112 can be an external device with relation to the microcomputer 10. The RAM 112 may include a rewritable nonvolatile memory in addition to the DRAM.

The RAM 112 stores communication connection device information 1121 and a reference strength table 1122. The communication connection device information 1121 includes device identification information regarding an external electronic device which is the communication connection destination of the short-range wireless communication by the communication unit 21. The external electronic device includes the sensor terminal 500. The device identification information may include information regarding the maximum value of the transmission radio wave strength which the external electronic device can transmit.

The oscillating circuit 15 generates a signal (clock signal) in a predetermined frequency and outputs the signal. When the clock signal is generated, for example, the crystal oscillator is used. Such crystal oscillator can be attached externally with relation to the microcomputer 10.

The frequency dividing circuit 16 outputs a dividing signal which divides the clock signal input from the oscillating circuit 15 at a set frequency dividing ratio. The setting of the frequency dividing ratio can be changed by the CPU 111.

The timekeeping circuit 17 keeps the present/date time by counting a signal (may be the same frequency as the clock signal) at a predetermined frequency input from the frequency dividing circuit 16 and holds the present date/time. The CPU 111 is able to correct the date/time counted by the timekeeping circuit 17 based on the present date/time information obtained from the external electronic device by the communication unit 21.

The communication unit 21 controls the transmitting and receiving of the radio wave regarding communication performed between the external electronic device (external communication apparatus) through the antenna A1 and the processing of data based on the communication standards. As described above, the communication unit 21 is able to communicate by Bluetooth.

The ROM 22 is a computer-readable recording medium which stores a program 221 for the controller 11 to execute the control operation and communication control data 222 for the communication unit 21 to control the communicating state. The ROM 22 may include a nonvolatile memory such as a flash memory in which the data is rewritable in addition to or instead of the mask ROM. The ROM 22 can be detachable from an attaching unit such as a slot. The program 221 includes a control program regarding controlling the communication state with the sensor terminal 500.

The measuring unit 23 measures various physical quantities with the sensor and outputs the determining data based on the measured value and the measured result to the controller 11. The measuring unit 23 here includes an acceleration sensor 231, a terrestrial magnetism sensor 232 and an illumination sensor 233. The acceleration sensor 231 measures the acceleration in tri-axial directions, and outputs the result to the controller 11. The terrestrial magnetism sensor 232 measures the magnetic field in tri-axial directions and outputs the result to the controller 11. The measured magnetic field is mainly a terrestrial magnetic field, but when the magnetism is found locally, the magnetic field is a combination of the local magnetic field overlapped on the local magnetic field. The illumination sensor 233 measures the optical amount of the entering light and outputs the result to the controller 11. The controller 11 uses each of the measured value of each sensor of the measuring unit 23 or combines a plurality of the above to detect the motion state or the holding state of the electronic device 100 according to the change over time, and makes a determination.

The display 24 displays various information based on control by the controller 11 (CPU 111). The display 24 includes a display driver 241 and a display screen 242. For example, the display screen 242 digitally displays a dot matrix liquid crystal display screen (LCD). The display driver 241 outputs to the display screen 242 the driving signal to display the display screen 242 based on the control signal from the controller 11. The display 24 can include the LED lamp for notification.

The operation/receiver 25 receives the input operation from outside such as user operation. The operation receiver 25 includes a touch panel provided overlapped on the display screen 242 and outputs to the controller 11 (CPU 111) the information regarding the position where the touch panel is touched and the time that the touch continued as the operation signal. The operation receiver 25 may include a press button switch or a rotating switch.

The power supply 30 supplies power from the battery 31 to each unit such as the microcomputer 10 of the electronic device 100 at a predetermined driving voltage. The electronic device 100 includes a charging battery as the battery 31 which can be charged by being connected to an external power supply. Alternatively, a detachable dry battery or rechargeable battery can be used.

Figure 3:
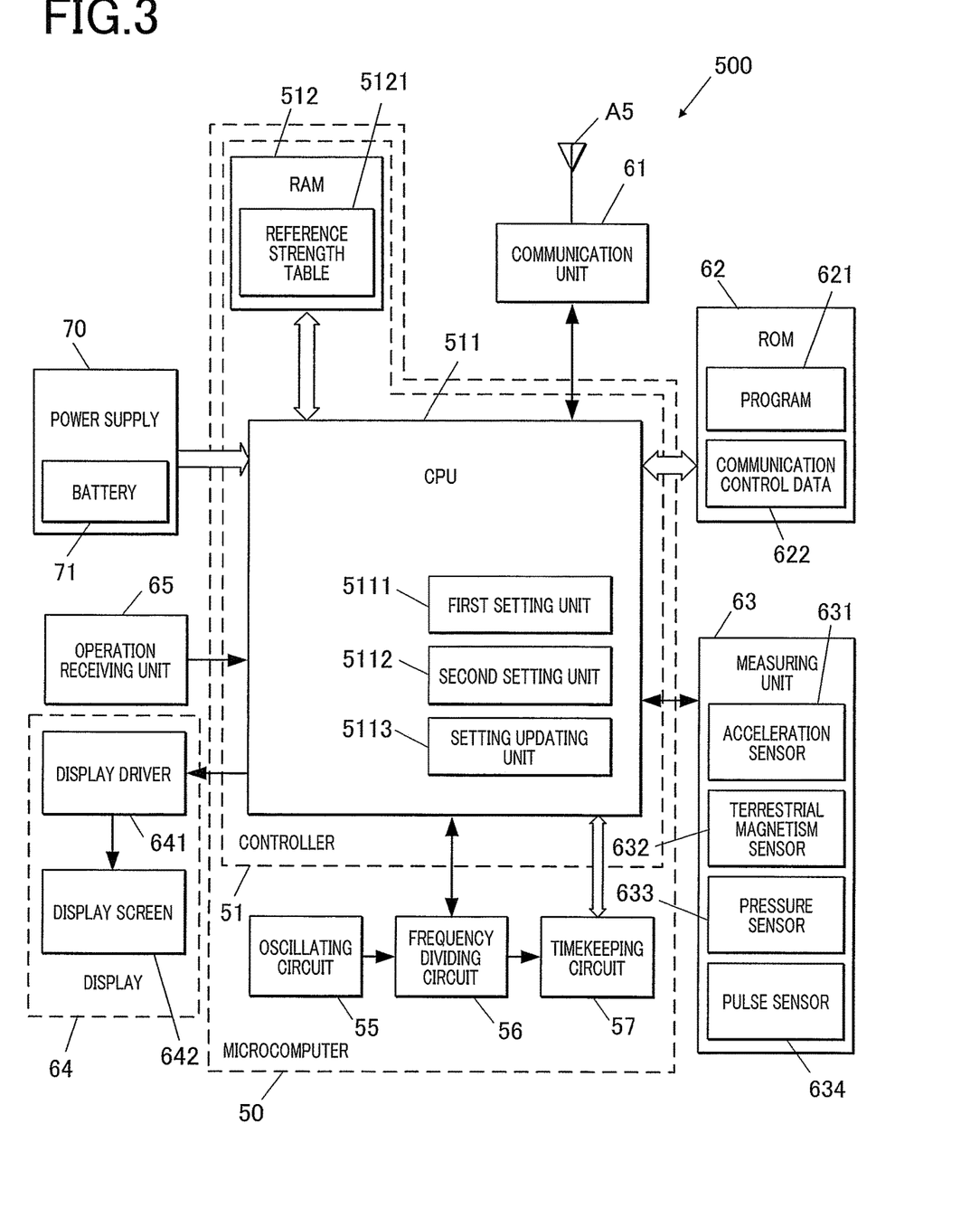
FIG. 3 is a block diagram showing a functional configuration of a sensor terminal.

FIG. 3 is a block diagram showing a functional configuration of the sensor terminal 500.

The sensor terminal 500 is an electronic terminal apparatus which can be attached to the user's body such as an arm. The sensor terminal 500 includes a microcomputer 50, a communication unit 61 and antenna A5, a ROM 62 (Read Only Memory), a measuring unit 63, a display 64, an operation receiver 65, and a power supply 70.

The microcomputer 50 of the sensor terminal 500 performs the process regarding various operations executed by the sensor terminal 500. The microcomputer 50 includes a controller 51, an oscillating circuit 55, a frequency dividing circuit 56, and a time keeping circuit 57.

The controller 51 is a processor which centrally controls the entire operation of the sensor terminal 500. The controller 51 includes a CPU 511 and a RAM 512.

The CPU 511 performs various calculating processes to perform the control operation. The control operation may include control of various displays by the display 64 such as date/time based on the date/time kept by the timekeeping circuit 57 and control of the processes for the live body information obtained from the sensor terminal 500. As described later, the CPU 511 operates as a first setting unit 5111, a second setting unit 5112, and a setting updating unit 5113 according to one embodiment of the communication apparatus.

The RAM 512 provides a memory space for work in the CPU 511 and temporarily stores data. The RAM 512 can be an external device with relation to the microcomputer 50. The RAM 512 may include a rewritable nonvolatile memory in addition to the DRAM.

The RAM 512 stores communication connection device information 5121 and a reference strength table 5122. The communication connection device information 5121 includes device identification information regarding an electronic device 100 which is the communication connection destination of the short-range wireless communication by the communication unit 61.

The oscillating circuit 55 generates a signal (clock signal) in a predetermined frequency and outputs the signal. When the clock signal is generated, for example, the crystal oscillator is used. Such crystal oscillator can be attached externally with relation to the microcomputer 50.

The frequency dividing circuit 56 outputs a dividing signal which divides the clock signal input from the oscillating circuit 55 at a set frequency dividing ratio. The setting of the frequency dividing ratio can be changed by the CPU 511.

The timekeeping circuit 57 keeps the present/date time by counting a signal (may be the same frequency as the clock signal) at a predetermined frequency input from the frequency dividing circuit 56 and holds the present date/time. The CPU 511 is able to correct the date/time counted by the timekeeping circuit 57 based on the present date/time information obtained from the electronic device 100 or other electronic devices by the communication unit 61.

The communication unit 61 controls the transmitting and receiving of the radio wave regarding communication performed between the external electronic device through the antenna A5 and the processing of data based on the communication standards. As described above, the communication unit 61 is able to communicate by Bluetooth.

The ROM 62 stores a program 621 for the controller 51 to execute the control operation and communication control data 622 for the communication unit 61 to control the communicating state. The ROM 62 may include a nonvolatile memory such as a flash memory in which the data is rewritable in addition to or instead of the mask ROM. The ROM 62 can be detachable from an attaching unit such as a slot. The program 621 includes a control program regarding controlling the communication state with the electronic device 100.

The measuring unit 63 measures various physical quantities with the sensor and outputs the determining data based on the measured value and the measured result to the controller 51. The measuring unit 63 here includes an acceleration sensor 631, a terrestrial magnetism sensor 632, a pressure sensor 633, and a pulse sensor 634. The acceleration sensor 631 measures the acceleration in tri-axial directions, and outputs the result to the controller 51. The terrestrial magnetism sensor 632 measures the magnetic field in tri-axial directions and outputs the result to the controller 51. The measured magnetic field is mainly a terrestrial magnetic field, but when the magnetism is found locally, the magnetic field is a combination of the local magnetic field overlapped on the local magnetic field. The pressure sensor 633 measures the pressure and outputs the value to the controller 51. The controller 51 is able to convert the obtained pressure value to an altitude value. The pulse sensor 634 measures the pulse at the attached wrist and outputs the measured result to the controller 51.

The display 64 displays various information based on control by the controller 51 (CPU 511). The display 64 includes a display driver 641 and a display screen 642. For example, the display screen 642 digitally displays a segment and/or dot matrix liquid crystal display screen (LCD). The display driver 641 outputs to the display screen 642 the driving signal to display the display screen 642 based on the control signal from the controller 51. The display 64 can includes the LED lamp for notification or for illuminating the liquid crystal display screen.

The operation/receiver 65 receives the input operation from outside such as user operation. The operation receiver 65 includes a press button switch, and the pressing operation is detected and output as an operation signal to the controller 51 (CPU 511). Alternatively, the operation receiver 65 includes a touch panel provided overlapped on the display screen 642 and outputs to the controller 51 (CPU 511) the information regarding the position where the touch panel is touched and the time that the touch continued as the operation signal.

The power supply 70 supplies power from the battery 71 to each unit such as the microcomputer 50 of the sensor terminal 500 at a predetermined driving voltage. The sensor terminal 500 includes a charging battery as the battery 71 which can be charged by being connected to an external power supply. Alternatively, a detachable dry battery or rechargeable battery can be used.

Next, the communication control operation (communication control method) in the communication system 1 is described.

According to the communication system 1, live body information such as pulse data obtained by the sensor terminal 500 as one communication apparatus or external communication apparatus is continuously transmitted from the sensor terminal 500 to the electronic device 100 as the other communication apparatus or the communication device using Bluetooth. In the electronic device 100, the obtained live body information is processed and the processing result is displayed. The measured live body information can also be displayed simply in the sensor terminal 500.

When the transmitted signal strength of the radio wave from the sensor terminal 500 is a certain strength, the received signal strength of the radio wave in the electronic device 100 (for example, RSSI (Received Signal Strength Indication)) changes depending on the distance between the sensor terminal 500 and the electronic device 100 or interference between the above. Among the above, as for periodic movement due to the user swinging the arms, the transmitted signal strength from the sensor terminal 500 can be periodically changed using well-known techniques, and the transmitted signal strength from the sensor terminal 500 can be set by matching to the minimum value of the received signal strength. With this, the transmitted signal strength can be maintained without being raised higher than necessary while maintaining connection for communication and transmission/reception of data. The consumption of power of the sensor terminal 500 is not increased more than necessary.

The received signal strength which is to be the reference in the electronic device 100 may change depending on the state of the electronic device 100, for example, the user holding the electronic device 100 with the hand or the user storing the electronic device 100 in the pocket of the user's clothes or in baggage. Similarly, the received signal strength which is to be the reference in the electronic device 100 may change depending on the situation of the sensor terminal 500, for example, the user wearing gloves or the user wearing or not wearing a coat. Such non-continuous change (non-continuous here means the strength changing in a state different from a state continuing until a certain timing (does not have to be a periodic change)) acts as a trigger (predetermined condition) in the electronic device 100, and the suitable transmitted signal strength from the sensor terminal 500 after the change (when the predetermined condition is satisfied) is determined. Then, the radio wave is transmitted from the sensor terminal 500 according to the determined radio wave transmitted signal strength.

Here, the non-continuous change in the electronic device 100 is directly determined based on the measuring data of the measuring unit 23. The non-continuous change in the sensor terminal 500 is determined by the controller 51 of the sensor terminal 500 based on the measuring data of the measuring unit 63 of the sensor terminal 500. When the determining condition regarding the non-continuous change is satisfied, the controller 51 transmits the resetting request for the transmitted signal strength Pt of the radio wave to the electronic device 100 through the communication unit 61.

The suitable received signal strength Pr0 (first reference of received signal strength) to surely obtain the live body information in the electronic device 100 is determined in advance. The transmitted signal strength Pt from the sensor terminal 500 can be set adjustable to be able to receive the received signal strength Pr0.

Figure 4:
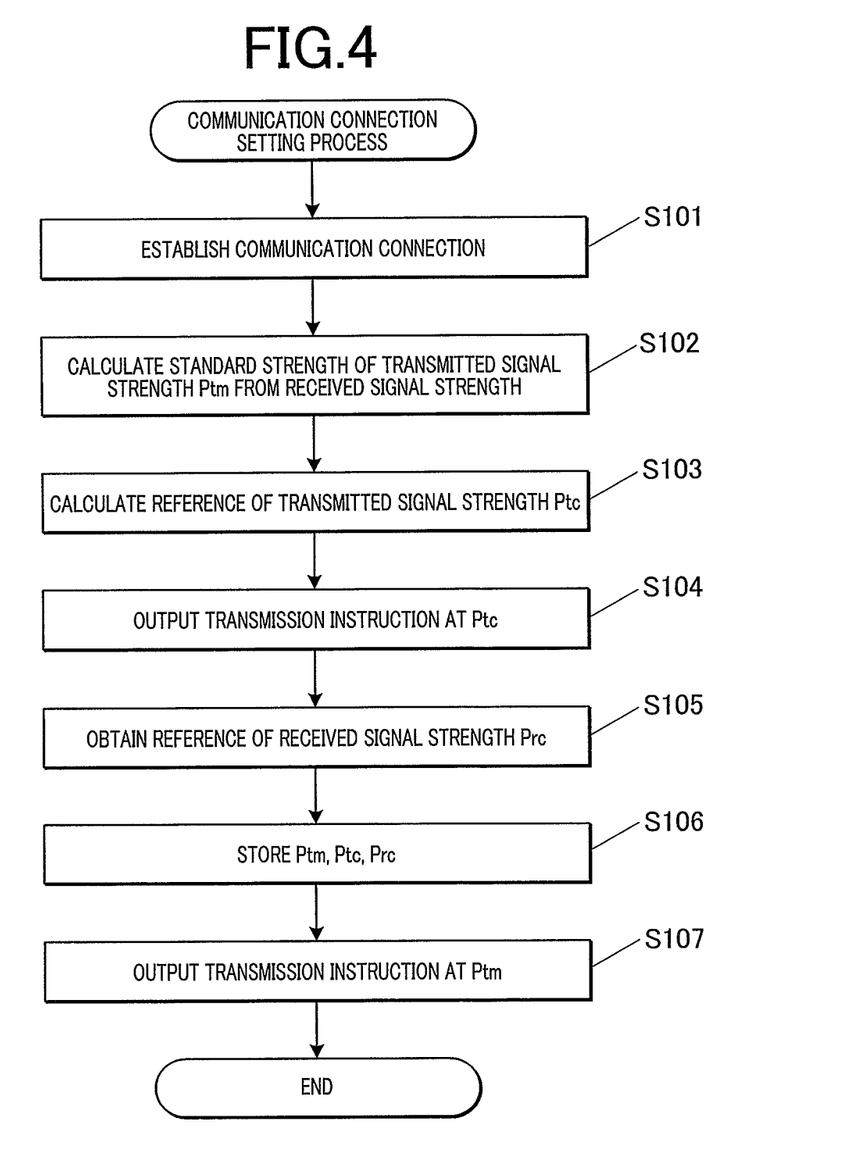
FIG. 4 is a flowchart showing a control process of a communication connection setting process performed in the electronic device.

FIG. 4 is a flowchart showing a control process by the controller 11 (CPU 111) to perform the communication connection setting process performed in the electronic device 100. The communication connection setting apparatus is called and started when a communication connection request is obtained from the sensor terminal 500.

When the communication connection setting process starts, the controller 11 (CPU 111) establishes communication connection with the sensor terminal 500 (step S101). The controller 11 obtains the received signal strength Pr in the initial state (predetermined communication state) after the communication connection is established. A standard strength of transmitted signal strength Ptm (first reference of transmitted signal strength) is calculated so that the received signal strength Pr is a suitable received signal strength Pr0 based on the transmitted signal strength Pt from the sensor terminal 500 obtained from the sensor terminal 500 and the calculated received signal strength Pr (step S102, first setting unit, first setting step). Here, the controller 11 calculates a value in which the difference between the received signal strength Pr and the received signal strength Pr0 is added to the transmitted signal strength Pt as the standard strength of transmitted signal strength Ptm.

The controller 11 refers to the communication connection device information 1121 to obtain the maximum strength of transmitted signal strength Ptmax of the sensor terminal 500, and calculates the reference of transmitted signal strength Ptc (second reference of transmitted signal strength) between the maximum strength of transmitted signal strength Ptmax and the standard strength of transmitted signal strength Ptm (step S103; second setting unit, second setting step). The magnitude of the reference of transmitted signal strength Ptc is to be a degree so that communication connection between the electronic device 100 and the sensor terminal 500 is ready when the received signal strength is attenuated to a normally assumed degree. Here, for example, the controller 11 is able to set the reference of transmitted signal strength Ptc to an average value (central value) between the maximum strength of transmitted signal strength Ptmax and the standard strength of transmitted signal strength Ptm.

The controller 11 outputs a radio wave transmitting instruction at the reference of transmitted signal strength Ptc to the sensor terminal 500 through the communication unit 21 (step S104). The controller 11 obtains the received signal strength Pr by the communication unit 21 for the radio wave transmitted at the reference of transmitted signal strength Ptc as the reference of received signal strength Prc (second reference of received signal strength) (step S105). The controller 11 may omit the process of steps S104 and S105, and the value adding the difference between the standard strength of transmitted signal strength Ptm and the reference of transmitted signal strength Ptc to the suitable received signal strength Pr0 can be the reference of received signal strength Prc.

The controller 11 stores the standard strength of transmitted signal strength Ptm and the reference of transmitted signal strength Ptc and the reference of received signal strength Prc in the reference strength table 1122 (step S106). The controller 11 outputs the transmitting instruction at the standard strength of transmitted signal strength Ptm to the sensor terminal 500 through the communication unit 21 (step S107). Then, the controller 11 ends the communication connection setting process.

Figure 5:
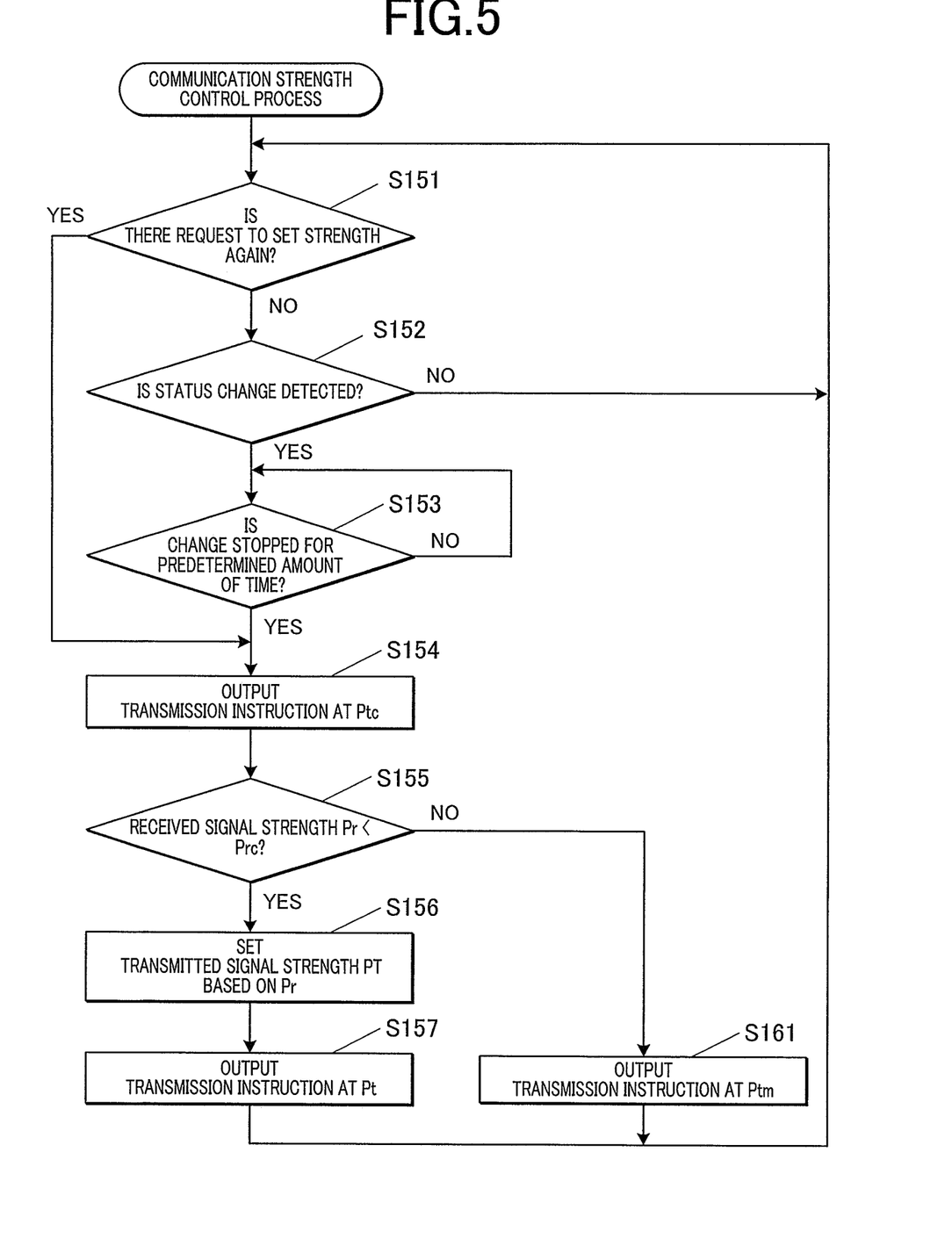
FIG. 5 is a flowchart showing a control process of a communication strength control process performed in the electronic device.

FIG. 5 is a flowchart showing a control process by the controller 11 (CPU 111) of the communication strength control process performed in the electronic device 100.

The communication strength control process is to be a setting updating unit in the communication apparatus and a setting updating step in the communication control method according to the present embodiment. The communication strength control process starts after the communication connection setting process and continues until the communication connection is canceled.

The controller 11 determines whether the request to reset the transmitted signal strength (request regarding the determination) is received (obtained) from the sensor terminal 500 (step S151). When it is determined that the resetting request is received (step S151, "YES"), the process of the controller 11 advances to step S154.

When it is determined that the resetting request is not received (step S151, "NO"), the controller 11 determines whether the change in the reception situation of the electronic device is detected (step S152). As the change in the reception situation, there is for example, detection of non-continuous acceleration or change in posture exceeding a predetermined reference level (when a continuous periodic acceleration is measured, a new movement in addition to such acceleration) or a drastic change in entering light amount. When it is determined that the situation change is not detected (step S152, "NO"), the process of the controller 11 returns to step S151.

When it is determined that the situation change is detected (step S152, "YES"), the controller 11 determines whether the detected situation change stopped and a predetermined amount of time passed (step S153). When a new movement is detected in step S152, the controller 11 determines whether the movement stopped (settled), and when the state advances to a new posture or state, the controller 11 determines whether the posture or state is maintained. When it is determined that the movement is not stopped or a predetermined amount of time has not passed after stopping (step S153, "NO"), the controller 11 repeats the process in step S153. When it is determined that a predetermined amount of time passed after stopping (step S153, "YES"), the process of the controller 11 advances to step S154.

When the process advances from steps S151 and S153 to step S154 (when the predetermined condition is satisfied), the controller 11 outputs the radio wave transmitting instruction at the reference of transmitted signal strength Ptc to the sensor terminal 500 through the communication unit 21 (step S154). The controller 11 obtains the received signal strength Pr by the communication unit 21 for the radio wave transmitted at the reference of transmitted signal strength Ptc and the controller 11 determines whether the received signal strength Pr is smaller than the reference of received signal strength Prc (step S155). When a periodic change by the movement (arm swinging) by the user is included in the received signal strength Pr, the controller 11 can obtain the representative value such as the average value or the minimum value for each amount of time according to the cycle of the movement (suitable amount of time equal to or more than half the cycle) as the received signal strength Pr.

When it is determined that the received signal strength Pr is smaller than the reference of received signal strength Prc (step S155, "YES"), the controller 11 sets the transmitted signal strength Pt so that the received signal strength Pr rises to the reference of received signal strength Prc (based on the difference between the received signal strength Pr and the reference of received signal strength Prc) (step S156). The controller 11 sets the transmitted signal strength Pt in which the shortage amount of the received signal strength Pr with relation to the reference of received signal strength Prc is added to the transmitted signal strength before changing to the reference of transmitted signal strength Ptc in step S154. The controller 11 outputs the transmitting instruction of the radio wave at the set transmitted signal strength Pt to the sensor terminal 500 through the communication unit 21 (step S157). Then, the process of the controller 11 returns to step S151.

In the determining process in step S155, when it is determined that the received signal strength Pr is equal to or more than the reference of received signal strength Prc (step S155, "NO"), the controller 11 sets (determines) the transmitted signal strength Pt as the standard strength of transmitted signal strength Ptm (step S161). Then, the process of the controller 11 returns to step S151.

[Modification]

The above-described setting of the transmission radio wave strength can be performed in the sensor terminal 500.

Figure 6:
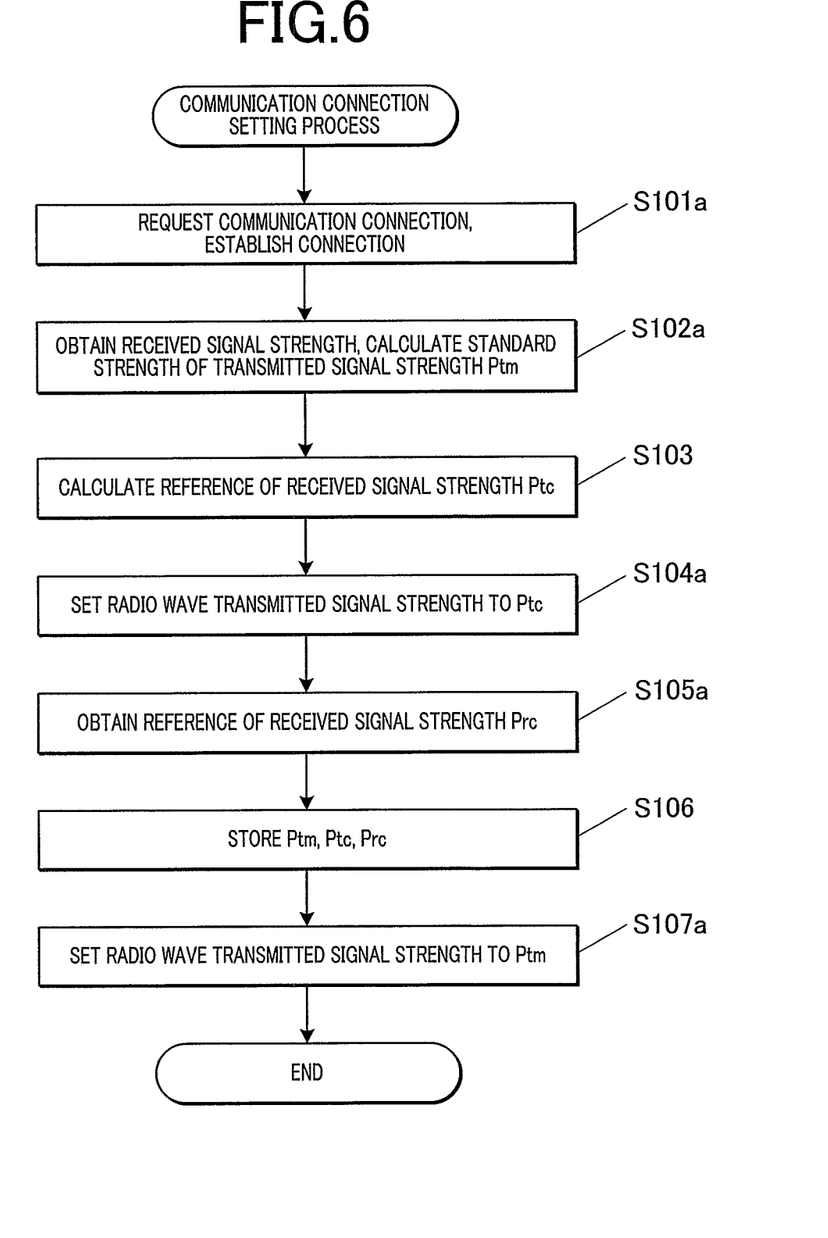
FIG. 6 is a flowchart showing a control process of a communication connection setting process performed in a sensor terminal.
Figure 7:
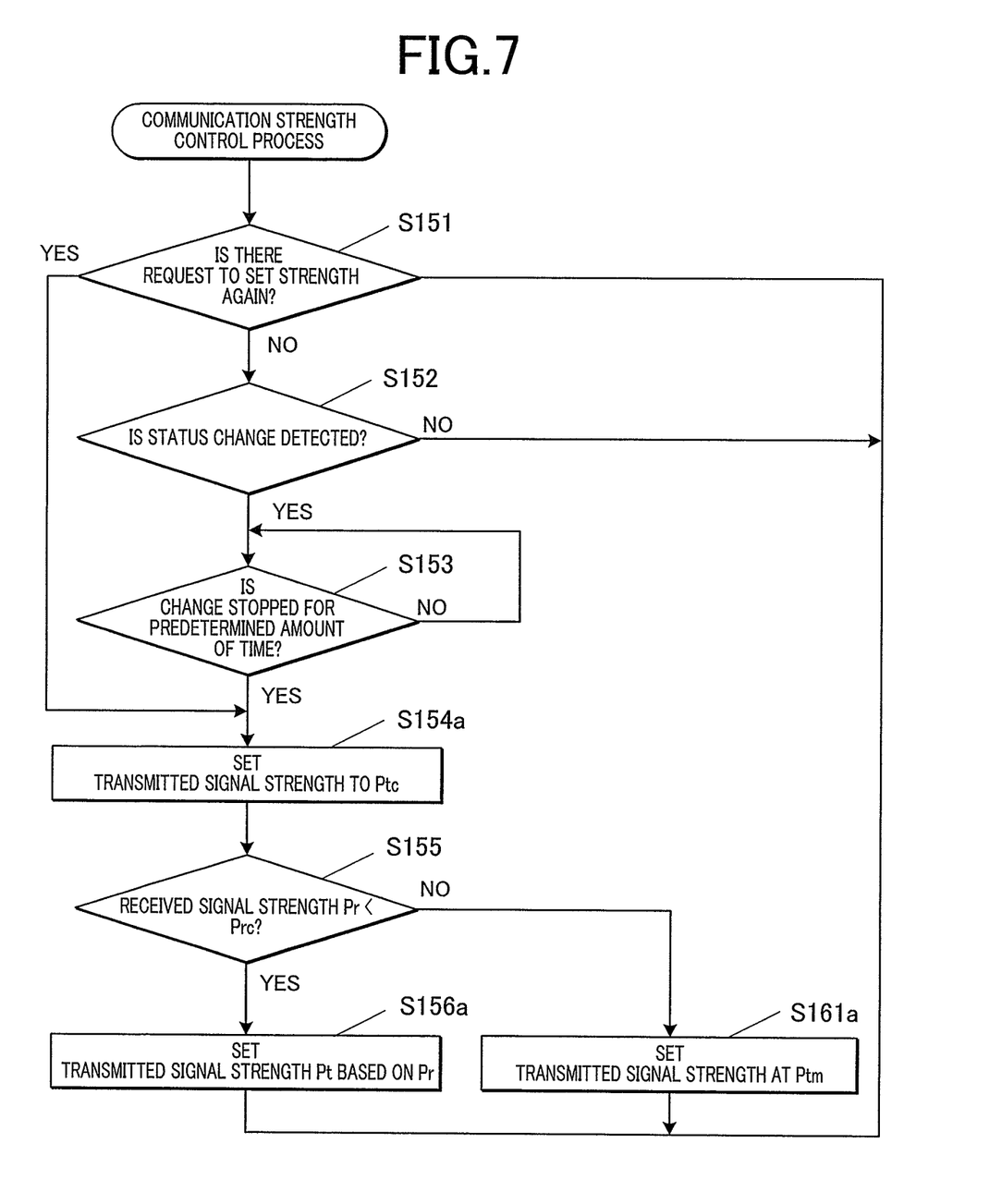
FIG. 7 is a flowchart showing a control process of a communication strength control process performed in the sensor terminal.

FIG. 6 is a flowchart showing the control process by the controller 51 in the communication connection setting process when the process is performed in the sensor terminal 500. FIG. 7 is a flowchart showing a control process by the controller 51 in the communication strength control process when the process is performed in the sensor terminal 500.

Compared to the communication connection setting process performed in the electronic device 100 shown in FIG. 4, in the communication connection setting process shown in FIG. 6, the process in steps S101, S102, S104, S105, and S107 is replaced with steps S101a, S102a, S104a, S105a, and S107a, respectively. The other processes are the same. The same reference numerals are applied to the same process and the detailed description is omitted.

The controller 51 (CPU 511) of the sensor terminal 500 (communication device in the modification) transmits a communication connection request to the electronic device 100 (external communication apparatus in the modification) through the communication unit 61 and establishes communication (step S101a). The controller 51 obtains the information of the received signal strength from the electronic device 100 and calculates the standard strength of transmitted signal strength Ptm (step S102a, first setting unit, first setting step). The controller 51 subtracts the difference between obtained received signal strength Pr and the suitable received signal strength Pr0 from the transmitted signal strength Pt at the time the communication connection is established to calculate the standard strength of transmitted signal strength Ptm.

The controller 51 performs the setting to transmit the radio wave at the reference of transmitted signal strength Ptc calculated in step S103 (second setting unit, second setting step) (step S104a). The controller 51 obtains the information of the received signal strength from the electronic device 100 and sets the reference of received signal strength Prc (step S105a). Similar to the communication connection setting process performed in the electronic device 100, the controller 51 omits the process in steps S104a and S105a, and calculates the reference of received signal strength Prc based on the difference between the standard strength of transmitted signal strength Ptm and the reference of transmitted signal strength Ptc, and the suitable received signal strength Pr0.

In the process in step S106, after the standard strength of transmitted signal strength Ptm, reference of transmitted signal strength Ptc, and the reference of received signal strength Prc are stored in the reference strength table 5122 of the RAM 512, the controller 51 sets the transmitted signal strength of the radio wave to the standard strength of transmitted signal strength Ptm (step S107a). Then, the controller 51 ends the communication connection setting process.

Compared to the communication strength control process performed in the electronic device 100 as shown in FIG. 5, in the communication strength control process shown in FIG. 7, the process of the steps S154, S156, and S161 is replaced with steps S154a, S156a, and S161a, respectively. The process in step S157 is omitted. The process in steps S151 to S153 is the same process. However, the strength resetting request in which the determination of obtaining is performed in the process of step S151 is a request obtained from the electronic device 100, whereas the change in the state detected in the process in steps S152 and S153 is a change in the state in the sensor terminal 500. The communication strength control process is the setting updating unit in the sensor terminal 500 as an embodiment of the communication apparatus and the setting updating step in the communication control method.

When the process advances from steps S151 and S153 to step S154a, the controller 51 (CPU 511) sets the transmitted signal strength of the radio wave to the reference of transmitted signal strength Ptc (step S154a). The controller 51 obtains the received signal strength Pr from the electronic device 100, and compares this with the reference of received signal strength Prc (step S155). When it is determined that the received signal strength Pr is smaller than the reference of received signal strength Prc (step S155, "YES"), the controller 51 performs the setting of the transmitted signal strength Pt based on the received signal strength Pr (step S156a). As described above, the controller 51 adds the shortage amount of the received signal strength Pr with relation to the reference of received signal strength Prc to the transmitted signal strength set previous to setting the reference of transmitted signal strength Ptc and sets the new transmitted signal strength Pt. Then, the process of the controller 51 returns to step S151.

In the determining process in step S155, when it is determined that the received signal strength Pr is equal to or more than the reference of received signal strength Prc (step S155, "NO"), the controller 51 sets the transmitted signal strength Pt to the standard strength of transmitted signal strength Ptm (step S161a). Then, the process of the controller 51 returns to step S151.

As described above, the electronic device 100 as one of the embodiments of the communication apparatus includes a communication apparatus including a communication unit 21 which transmits and receives the radio wave and the controller 11. The controller 11 functions as the first setting unit, the second setting unit, and the setting updating unit. The first setting unit determines, according to the suitable received signal strength Pr0 in the one communication apparatus in a predetermined communication state with the sensor terminal 500 as the external communication apparatus through the communication unit 21, the standard strength of transmitted signal strength Ptm which is the transmitted signal strength for the transmission radio wave from the other communication apparatus which is an external communication apparatus or the electronic device 100. The second setting unit determines the reference of transmitted signal strength Ptc between the standard strength of transmitted signal strength Ptm and the maximum strength of transmitted signal strength Ptmax from the other communication apparatus. When the predetermined condition is satisfied, the setting updating unit obtains the received signal strength Pr by the one communication apparatus for the transmission radio wave at the reference of transmitted signal strength Ptc and determines the transmitted signal strength Pt of the transmission radio wave from the other communication apparatus according to the received signal strength Pr.

Alternatively, the sensor terminal 500 as one of the embodiments of the communication apparatus includes a communication unit 61 which performs the transmission/reception of the radio wave and the controller 51. The controller 51 functions as the first setting unit, the second setting unit, and the setting updating unit. The first setting unit determines, according to the suitable received signal strength Pr0 of the one communication apparatus which is either the external communication apparatus or the sensor terminal 500 in the predetermined communication state with the electronic device 100 as the external communication apparatus through the communication unit 61, the standard strength of transmitted signal strength Ptm which is the transmitted signal strength for the transmission radio wave from the other communication apparatus. The second setting unit determines the reference of transmitted signal strength Ptc between the standard strength of transmitted signal strength Ptm and the maximum strength of transmitted signal strength Ptmax from the other communication apparatus. When the predetermined condition is satisfied, the setting updating unit obtains the received signal strength Pr by one communication apparatus for the transmission radio wave at the reference of transmitted signal strength Ptc and determines the transmitted signal strength Pt of the transmitted radio wave from the other communication apparatus according to the received signal strength Pr.

According to the communication apparatus, when the communication state changes, the suitable transmitted signal strength Pt for the transmission radio wave is set. Therefore, the communication state can be suitably maintained without increasing the consumption of electric power more than necessary. The transmitted signal strength Pt is set again only when the necessary condition is satisfied. Therefore, it is possible to avoid the increase of the load due to always performing the process regarding the maintaining of the transmitted/received signal strength of the radio wave. The received signal strength changes non-continuously with the change in the communication state. Once the strength of the transmission radio wave is set evenly to the reference of transmitted signal strength Ptc and the new suitable Pt is determined, the change to the transmission strength Pt which enables both the maintaining of the suitable communication state and the suitable consumption of power can be made easily, swiftly, and reliably in one process. Therefore, the communication radio wave can be transmitted and received more efficiently between the electronic device 100 and the sensor terminal 50.

Both the electronic device 100 and the sensor terminal 500 do not have to be provided with the first setting unit, the second setting unit, and the setting update unit at the same time as the embodiment of the communication apparatus, but both the electronic device 100 and the sensor terminal 500 can be provided with the above units at the same time.

The controller 11 (controller 51) determines the reception strength by the communication unit 21 for the transmission radio wave at the reference of transmitted signal strength Ptc in the predetermined communication state as the reference of received signal strength Prc. The transmitted signal strength by the communication unit 21 is determined based on the difference between the received signal strength Pr of the transmission radio wave at the reference of transmitted signal strength Ptc and the reference of received signal strength Prc.

As described above, by fixing the transmitted signal strength of the radio wave in the resetting, the resetting of the transmitted signal strength is performed using the difference between the received signal strength at that time and the reference of received signal strength Prc stored in advance, the transmitted signal strength with which the suitable received signal strength can be obtained can be determined easily with one process. With this, a reliable connection can be established swiftly and the communication can be performed at a suitable electric power consumption amount.

When the received signal strength Pr for the transmission radio wave at the reference of transmitted signal strength Ptc is equal to or more than the reference of received signal strength Prc, the controller 11 (controller 51) determines the transmitted signal strength Pt as the standard strength of transmitted signal strength Ptm. As described above, even if the received signal strength Pr is temporarily better than the initial state originally assumed to be the suitable condition, the transmitted signal strength Pt does not decrease more than the standard strength of transmitted signal strength Ptm. Therefore, it is possible to reduce the possibility that the setting of the transmitted signal strength Pt is performed again more than necessary or the communication connection is not ready due to the communication state returning to the original state.

The predetermined communication state is the initial state in which communication connection with the sensor terminal 500 (electronic device 100) which is the external communication apparatus is established. When the initial operation to establish the communication connection is performed, normally, the electronic device 100 and the sensor terminal 500 are aligned at a close distance without obstacles, and are in a suitable reception condition. The standard strength of transmitted signal strength Ptm and the reference of transmitted signal strength Ptc are determined using the communication setting in such state. With this, the stable communication connection is maintained and the suitable resetting of the transmitted signal strength Pt can be reliably performed.

The reference of transmitted signal strength Ptc is an average value of the standard strength of transmitted signal strength Ptm and the maximum strength of transmitted signal strength Ptmax. As described above, by setting the reference of transmitted signal strength Ptc to the intermediate value between the desirable value with which communication is possible in a good communication state and the maximum value with which transmission is possible, and the communication connection when the transmitted signal strength Pt is set again is suitably maintained while the power consumption is not increased more than necessary.

The controller 11 (controller 51) determines that the predetermined condition is satisfied when it is determined that the communication state changed to a different state due to non-continuous change different from the periodic movement of the user such as the electronic device 100 moving from the hand to the pocket or from the hand to inside baggage, the position of the electronic device 100 changing with relation to other things inside the baggage (including when other things are put in to or taken out from the baggage), or the user wears or takes off a coat which covers the attached portion of the sensor terminal 500. In such determination, the measured values by sensors such as the measuring unit 23 and/or the measuring unit 63 are used (that is, for example, change in the movement or entering of external light). When there is a change in the basic reception situation instead of detailed change in the cycle, the transmission radio wave strength is set again to match the changed reception state. Therefore, it is possible to reduce unnecessary resetting processes. Moreover, the transmission radio wave strength is not greatly changed in response to short temporary changes. Therefore, it is possible to suppress situations such as the radio wave strength increasing or decreasing more than necessary, resulting in increase of electric power consumption, or the maintaining of the communication connection becoming difficult.

The electronic device 100 includes a measuring unit 23 which detects the movement state of the electronic device, and when the measuring unit 23 detects a new movement equal to or more than a predetermined reference level and the movement settles, the controller 11 determines that the predetermined condition to set the transmitted signal strength again (perform determination operation) is satisfied.

As described above, instead of directly monitoring the received signal strength, the non-continuous change in the radio wave transmission/reception environment is detected and the transmitted signal strength Pt is set again only when it is considered to be necessary. Therefore, there is no need to perform fine adjustment more than necessary, and the process becomes simple. Specifically, the burden of the process to detect the movement of the user is small, and the process can be performed easily with low electric power consumption.

The measuring unit 23 includes an acceleration sensor 231. The movement state of the electronic device and the change in the movement state can be easily detected by the measurement data of the acceleration sensor 231. Therefore, it is possible to suitably determine the timing to set the transmitted signal strength Pt again.

When the new movement ends and a predetermined amount of time passes, the controller 11 determines that the new movement settled. As described above, the transmitted signal strength Pt is set again not only when the state of the electronic device changes but also after a predetermined amount of time passes after detecting the end of the movement. Therefore, it is possible to prevent the transmitted signal strength Pt being reset repeatedly a plurality of times in the middle of the state changing or after the movement ends. Therefore, it is possible to suppress the increase of the burden of processing and the electric power consumption.

The controller 11 determines that the predetermined condition is satisfied when the request to determine the transmitted signal strength Pt is obtained from the sensor terminal 500. That is, in addition to the change of the electronic device 100 such as the movement state and posture, the notification regarding the change in the state of the sensor terminal 500 is received from the sensor terminal 500 and this acts as the trigger to reset the transmitted signal strength Pt. With this, the communication state of the sensor terminal 500 and the electronic device 100 can be maintained suitably.

The communication control method in the electronic device 100 according to the present embodiment includes the following steps. According to the suitable received signal strength Pr0 in one communication apparatus which is either the external communication apparatus or the electronic device 100 in the predetermined communication state with the sensor terminal 500 which is the external communication apparatus through the communication unit 21, the first setting step determines as the standard strength of transmitted signal strength Ptm the transmitted signal strength Pt for the transmission radio wave from the other communication apparatus. The second setting step determines the reference of transmitted signal strength Ptc between the standard strength of transmitted signal strength Ptm and the maximum strength of transmitted signal strength Ptmax from the other communication apparatus. When the predetermined condition is satisfied, the setting updating step obtains the received signal strength Pr by the one communication apparatus for the transmission radio wave in the reference of transmitted signal strength Ptc and determines the transmitted signal strength Pt of the transmission radio wave from the other communication apparatus according to the received signal strength Pr.

Alternatively, the communication control method according to the sensor terminal 500 of the present embodiment includes the following. According to the suitable received signal strength Pr0 in one communication apparatus which is either the external communication apparatus or the sensor terminal 500 in the predetermined communication state with the electronic device 100 which is the external communication apparatus through the communication unit 61, the first setting step determines as the standard strength of transmitted signal strength Ptm the transmitted signal strength Pt for the transmission radio wave from the other communication apparatus. The second setting step determines the reference of transmitted signal strength Ptc between the standard strength of transmitted signal strength Ptm and the maximum strength of transmitted signal strength Ptmax from the other communication apparatus. When the predetermined condition is satisfied, the setting updating step obtains the received signal strength Pr by the one communication apparatus for the transmission radio wave in the reference of transmitted signal strength Ptc and determines the transmitted signal strength Pt for the transmission radio wave from the other communication apparatus according to the received signal strength Pr.

As described above, when the communication state changes, the transmitted signal strength Pt suitable for the transmission radio wave is set with the reference of transmitted signal strength Ptc as the reference with which communication can be performed reliably. Therefore, it is possible to perform an operation which sets the above easily and swiftly within the range that the electric power consumption is not increased more than necessary to maintain the suitable communication state. Therefore, it is possible to perform the transmission/reception of the communication radio wave more efficiently between the electronic device 100 and the sensor terminal 500.

The present invention is not limited to the above-described embodiments and various changes are possible.

For example, according to the present embodiment, the reference of transmitted signal strength Ptc is the middle value (average) between the standard strength of transmitted signal strength Ptm and the maximum strength of transmitted signal strength Ptmax, but the present invention is not limited to the above. The reference of transmitted signal strength Ptc may be differed from the average value. Alternatively, for example, the strength a predetermined amount larger than the standard strength of transmitted signal strength Ptm can be the reference of transmitted signal strength Ptc.

According to the above-described embodiment, the standard strength of transmitted signal strength Ptm is set based on the initial received signal strength Pr when the communication connection is established, but the present invention is not limited to the above. For example, in the communication connection between preset communication apparatuses, once the ideal standard strength of transmitted signal strength Ptm is set, this can be held and repeatedly used. Alternatively, after the communication connection is established, the ideal standard strength of transmitted signal strength Ptm can be determined based on the received signal strength Pr at the timing determined based on the predetermined input operation on the operation receiver 65.

According to the present embodiment, the change in the communication state is determined using the acceleration sensor and the terrestrial magnetic sensor, but the measuring unit is not limited to the above. For example, other sensors such as a gyro sensor can be included. Alternatively, radio waves can be received from a plurality of positioning satellites to measure the present position (positioning).

According to the present embodiment, only the reset request for the transmitted signal strength is obtained from the sensor terminal 500. Alternatively, the measuring data of the measuring unit 63 can be obtained from the sensor terminal 500 and the determination regarding whether there is a change in the communication state can be determined based on the measurement data. In this case, the transmitted and received measurement data may have a lower accuracy than the actual measured data considering the communication speed.

The movement settling does not mean only the new movement ending but also includes when the new movement is periodic and it is confirmed that the movement continues.

According to the present embodiment, the processing of receiving the radio wave is ready due to the non-continuous movement or state or the change in the posture. If the processing of receiving the radio wave happens to be not ready, the transmitted signal strength of the radio wave from the sensor terminal 500 is automatically changed to the reference of transmitted signal strength Ptc to resume radio wave reception. Then, the transmitted signal strength is set again based on the received signal strength of the radio wave Pr.

Here, the transmitted signal strength Pt as the setting target is the transmitted signal strength of the transmission radio wave from the sensor terminal 500 to the electronic device 100. The reset operation may determine the transmitted signal strength Pt based on the degree of the received signal strength by the sensor terminal 500 for the transmission radio wave from the electronic device 100 to the sensor terminal 500. In this case, directivity of the transmission radio wave from the electronic device 100 and the influence of the reception sensitivity by the reception circuit of the sensor terminal 500 can be considered as the correction parameter. When continuous transmission of information from the electronic device 100 to the sensor terminal 500 (external communication device) is necessary, various embodiments reflecting the present invention can be used to set the transmission radio wave strength from the electronic device 100.

According to the present embodiment, the pulse data is described as the live body information as the target of measurement. Alternatively, other information such as data regarding number of steps in walking or blood pressure can be used.

Alternatively, the present embodiment is described with the live body information being transmitted and received but the transmitted/received data is not limited to live body data. For example, the suitable communication state can be maintained by controlling the setting of the transmission radio wave strength similar to the present embodiment when the sound obtained with a sound collecting unit (microphone) of the external terminal can be transmitted to the electronic device or when the image obtained by the imaging unit (camera or infrared sensor) of the external terminal is transmitted to the electronic device.

According to the present embodiment, communication is performed by Bluetooth, but the present invention is not limited to the above. The control of setting the transmission radio wave strength can be performed similarly in other short range wireless communication or data communication such as Wi-Fi (wireless LAN).

According to the present embodiment, the controller 11 including the CPU 11 performs control to the transmitted signal strength of the radio wave as the software process but some or all of the control process can be performed by the hardware circuit.

According to the above description, as the computer-readable medium which stores the programs 221 and 621 which control the strength of the radio wave transmission according to the present invention when the present date/time information is obtained is not limited to the ROM 22, 62 including the nonvolatile memory such as the flash memory or the mask ROM. As other computer-readable mediums, portable recording mediums such as a HDD (Hard Disk Drive), CD-ROM or DVD disk can be applied. Alternatively, a carrier wave can be applied to the present invention as the medium to provide the data of the program regarding the present invention through communication lines.

Other specific details of the configuration, the control process and the illustrated examples as described in the present invention can be suitably modified without leaving the scope of the present invention.

Various embodiments according to the present invention are described, but the scope of the present invention is not limited by the above-described embodiments, and the present invention includes the scope as described in the attached claims and its equivalents.

What is claimed is:

1. A communication apparatus comprising:
   a communication unit which transmits and receives a radio wave; and
   a controller which:
   determines, according to a first reference of received signal strength in a first communication apparatus which is either an external communication apparatus or the communication apparatus when in a predetermined communication state with the external communication apparatus through the communication unit, a transmitted signal strength for a transmission radio wave from a second communication apparatus which is the other one of the communication apparatus and the external communication apparatus, as a first reference of transmitted signal strength;
   determines a second reference of transmitted signal strength between the first reference of transmitted signal strength and a maximum strength of transmitted signal strength from the second communication apparatus; and when a predetermined condition is satisfied, outputs to the second communication apparatus a radio wave transmission instruction which requests the transmission radio wave to be transmitted at the second reference of transmitted signal strength, obtains a received signal strength at the first communication apparatus for the transmission radio wave at the second reference of transmitted signal strength transmitted from the second communication apparatus in response to the radio wave transmission instruction, and determines a transmitted signal strength of a transmission radio wave from the second communication apparatus according to the received signal strength.

2. The communication apparatus according to claim 1, wherein:

the controller determines the received signal strength of the transmission radio wave at the second reference of transmitted signal strength in the predetermined communication state as a second reference of received signal strength, and the controller determines the transmitted signal strength based on a difference between the received signal strength of the transmission radio wave and the second reference of received signal strength.

3. The communication apparatus according to claim 2, wherein the predetermined communication state is an initial state in which communication is being established between the communication apparatus and the external communication apparatus.

4. The communication apparatus according to claim 2, wherein the second reference of transmitted signal strength is an average value between the first reference of transmitted signal strength and the maximum strength of transmitted signal strength.

5. The communication apparatus according to claim 2, wherein the predetermined condition is a non-continuous change to a different communication state.

6. The communication apparatus according to claim 2, wherein the controller determines the transmitted signal strength as the first reference of transmitted signal strength when the received signal strength for the transmission radio wave in the second reference of transmitted signal strength is equal to or larger than the second reference of received signal strength.

7. The communication apparatus according to claim 6, wherein the predetermined communication state is an initial state in which communication is being established between the communication apparatus and the external communication apparatus.

8. The communication apparatus according to claim 6, wherein the second reference of transmitted signal strength is an average value between the first reference of transmitted signal strength and the maximum strength of transmitted signal strength.

9. The communication apparatus according to claim 6, wherein the predetermined condition is a non-continuous change to a different communication state.

10. The communication apparatus according to claim 1, wherein the predetermined communication state is an initial state in which communication is being established between the communication apparatus and the external communication apparatus.

11. The communication apparatus according to claim 10, wherein the second reference of transmitted signal strength is an average value between the first reference of transmitted signal strength and the maximum strength of transmitted signal strength.

12. The communication apparatus according to claim 10, wherein the predetermined condition is a non-continuous change to a different communication state.

13. The communication apparatus according to claim 1, wherein the second reference of transmitted signal strength is an average value between the first reference of transmitted signal strength and the maximum strength of transmitted signal strength.

14. The communication apparatus according to claim 1, wherein the predetermined condition is a non-continuous change to a different communication state.

15. The communication apparatus according to claim 14, further comprising a movement detector which detects a movement state of the communication apparatus, wherein the controller determines that the predetermined condition is satisfied when a new movement equal to or more than a predetermined reference level is detected by the movement detector and the movement settles.

16. The communication apparatus according to claim 15, wherein the movement detector includes an acceleration sensor.

17. The communication apparatus according to claim 15, wherein the controller determines that the new movement settles when a predetermined amount of time passes after the new movement ends.

18. The communication apparatus according to claim 1, wherein the predetermined condition is that a request to determine the transmitted signal strength is received from the external communication apparatus.

19. A communication apparatus comprising:

a communication unit which transmits and receives a radio wave;

a first setting unit which determines, according to a first reference of received signal strength in a first communication apparatus which is either an external communication apparatus or the communication apparatus when in a predetermined communication state with the external communication apparatus through the communication unit, a transmitted signal strength for a transmission radio wave from a second communication apparatus which is the other one of the communication apparatus and the external communication apparatus, as a first reference of transmitted signal strength;

a second setting unit which determines a second reference of transmitted signal strength between the first reference of transmitted signal strength and a maximum strength of transmitted signal strength from the second communication apparatus; and a setting updating unit which, when a predetermined condition is satisfied, outputs to the second communication apparatus a radio wave transmission instruction which requests the transmission radio wave to be transmitted at the second reference of transmitted signal strength, obtains a received signal strength at the first communication apparatus for the transmission radio wave at the second reference of transmitted signal strength transmitted from the second communication apparatus in response to the radio wave transmission instruction, and determines a transmitted signal strength of a transmission radio wave from the second communication apparatus according to the received signal strength.

20. A communication control method used in a communication apparatus including a communication unit which transmits and receives a radio wave, the method comprising:

- determining, according to a first reference of received signal strength in a first communication apparatus which is either an external communication apparatus or the communication apparatus when in a predetermined communication state with the external communication apparatus through the communication unit, a transmitted signal strength for a transmission radio wave from a second communication apparatus which is the other one of the communication apparatus and the external communication apparatus, as a first reference of transmitted signal strength;
- determining a second reference of transmitted signal strength between the first reference of transmitted signal strength and a maximum strength of transmitted signal strength from the second communication apparatus; and
- when a predetermined condition is satisfied, outputting to the second communication apparatus a radio wave transmission instruction which requests the transmission radio wave to be transmitted at the second reference of transmitted signal strength, obtaining a received signal strength at the first communication apparatus for the transmission radio wave at the second reference of transmitted signal strength transmitted from the other communication apparatus in response to the radio wave transmission instruction, and determining a transmitted signal strength of a transmission radio wave from the second communication apparatus according to the received signal strength.

* * * * *